United States Patent Office 2,991,179
Patented July 4, 1961

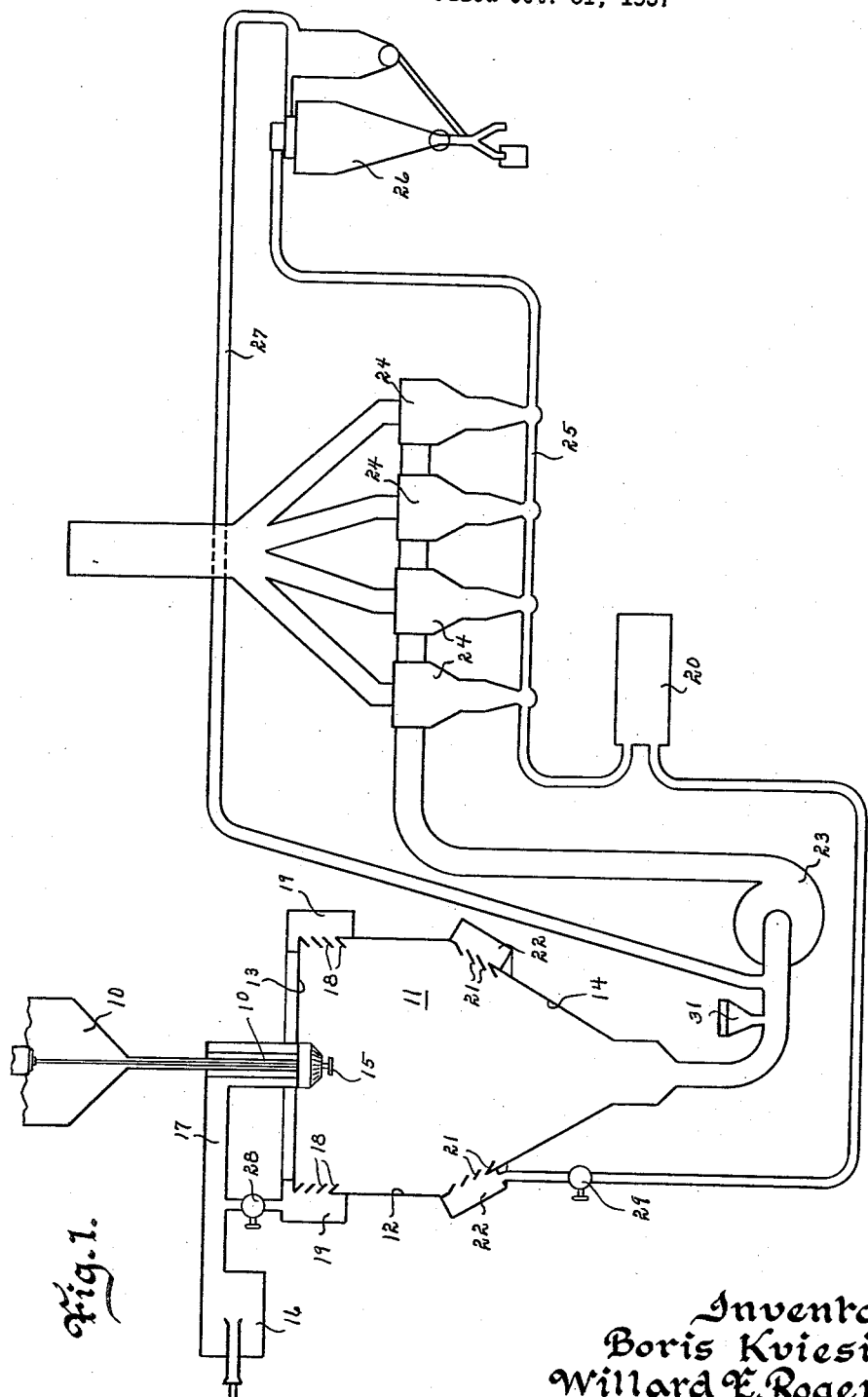

2,991,179
METHOD OF AND MEANS FOR DEHYDRATING FLOWABLE MATTER
Boris Kviesitis and Willard E. Rogerson, Des Moines, Iowa, assignors to Vy Lactos Laboratories, Inc., Des Moines, Iowa
Filed Oct. 31, 1957, Ser. No. 693,625
5 Claims. (Cl. 99—6)

This invention relates to the method of and means for dehydrating flowable viscous materials such as syrups, fish solubles, molasses, and like.

The dehydrating of matter is an old art. While some flowable products are easily dehydrated, others are most difficult. This is especially true of certain viscous materials. One of the chief problems is to prevent the sticky particles from adhering to the equipment during the dehydrating phase. Still another problem is to prevent the breakdown and/or destruction of certain values within the matter being dehydrated.

Therefore, one of the principal objects of this invention is to provide a method and means for keeping the equipment from becoming fouled and incrusted with the material being dehydrated.

A further object of our invention is to provide a method of retaining and preserving certain desirable products of the raw material during and after dehydration of the same.

A still further object of this invention is to provide a rapid and controlled means of dehydrating flowable matter.

A still further object of this invention is to provide dehydrating equipment that is substantially automatic in its operation.

Still further objects of our invention are to provide a method of and means for dehydrating flowable material that is economical in operation and economical in manufacture.

These and other objects will be apparent to those skilled in the art.

Our invention consists in the method of construction, arrangement and combination of the various parts of the device, whereby the objects contemplated are attained as hereinafter more fully set forth, pointed out in our claims and illustrated in the accompanying drawing, in which FIG. 1 is a schematic view of our plant equipment for dehydrating flowable matter.

In this drawing we have used the numeral 10 to designate a conduit adapted to be in communication with a supply source of the matter to be dehydrated. The numeral 11 designates the dehydrating tank chamber having a cylindrical wall 12, an inclosed top 13, and an inverted cone lower portion 14. With the exception of certain features of the tank 11, substantially all of the various major equipment parts of the entire plant are standard equipment. The arrangement and combination of these various phases of our plant, however, are new. The conduit 10 extends into the center top inside area of the tank chamber 11. Mounted in the center top area of the tank 11 is an ordinary powered rotating distributing spinner 15 receiving matter from the conduit 10, and flinging the same in a spray outwardly and downwardly into the tank chamber 11. The numeral 16 designates any suitable standard hot air producing furnace or like having its hot air conduit 17 terminating just above the spinner 15 and inside the tank chamber 11. The numeral 18 designates downwardly and inwardly extending baffle louvers in and extending around the upper portion of the tank wall. The numeral 19 designates an inclosed distribution jacket around the wall 12, embracing the louvers 18 and communicating with the hot air supply conduit 17. The numeral 20 designates an ordinary dehumidified air cooler unit. The numeral 21 designates baffle louvers in and extending around the upper end. These louvers extend inwardly and downwardly and are embraced by the cool dehumidified air distribution jacket 22. This jacket 22 communicates with the air cooling means 20. The numeral 23 designates an ordinary exhaust motorized fan means having its inlet communicating with the inside bottom of the inverted cone portion 14. The outlet of this fan pump 23 extends to the ordinary cyclone separators 24. These separators separate the dried particles from the air and the dried particles pass into the collector conduit 25 which is also connected to the air cooler 20. The cool air and particles pass to the ordinary separator 26. The cooled particles collect at the bottom for transfer to storage. The cool air passes through the pipe 27 to the intake area of the suction fan means 23. The numeral 28 designates a gate valve in the in lead of the jacket 19. The numeral 29 designates a gate valve in the in lead of the jacket 22. The louvers 18 and 21 act to make the plant workable inasmuch as it is the presence, and especially the presence of the louvers 18, that prevents the objectionably caking and fouling of the inside of the tank 11 by the sticky adhering matter being dehydrated. The pump fan 23 will draw the central hot air and drying particles in a circular path downwardly within the drying chamber of tank 11. Also, this downward draft induced by both the furnace 16 and fan 23 will draw hot air through the louvers 18. Inasmuch as these louvers extend inwardly and downwardly and around the circumference of the wall 12, the clean air passing through the lovers will follow the inner side of the wall 12 in a circular path downwardly and will act as a curtain to shield the inner side of the wall, and cause the sticky particles being dehydrated to follow a centrally located downwardly extending column area. Thus, the sticky particles are kept from engagement wit hthe inside surface of the dehydrating chamber until they have become dry and non-sticky.

The dehydrating of blackstrap molasses in our plant in an excellent illustration of its functioning. Blackstrap molasses is composed of a solution primarily of sugars and organic acids and minerals in which some colloidal substances, such as gum and insoluble minerals, are suspended. Particles of this colloidal substance are of different sizes, thus presenting problems in dehydration process. Success of drying depends on uniform atomization of liquid material. Therefore, molasses should be purified from all colloidal parts which are interfering in proper atomization.

Generally, molasses is sold of density ranging from 79.5 to 90° Brix. Purification of this molasses is accomplished by the following method:

(1) Molasses diluted with water to 42° Brix;
(2) Heated to 90–100° F.;
(3) One percent by weight of calcium hydroxide added and the mixture agitated for ten minutes.
(4) Mixture is left in a vertical tank with conical bottom for twelve to twenty-four hours to allow to settle suspended colloidal particles. The clear supernatant liquid is then transferred to operating tanks. This purified liquid is ready for dehydration by passing through the conduit 10. Instead of leaving liquid in a settling tank for several hours, a high speed centrifuge may be used.

The diluted molasses after purification is heated by direct steam injection to 180–190° F. and sprayed by means of the spinner 15 into the drying chamber 11.

The hot air at a temperature of 300–400° F. from the pipe 17 induces the drying.

The liquid spray is instantly dried to a powder with a low moisture content. Material which is now in powder form is suspended in hot air and travelling concentrically toward the conical bottom of drying chamber 11. To prevent deposition of products on the hot sides of the drying chamber an additional volume of warm and dry air is introduced through the louvers 18. This air of ten per cent of total volume of drying gases enters at high speed in concurrent direction. The purpose of this additional air through the louvers 18 is the following:

(a) To keep temperature of the inside top and upper part of the surface of the drying chamber at moderate temperature.

(b) To develop a protection shield of clean dry warm air between the inside top and the upper part of the drying chamber and the product traveling toward the bottom of the tank. Particles approaching the conical part of the drying chamber still contain a small amount of moisture which should be removed. At this stage the product is heat sensitive and a slow drying process is required to remove the final moisture. Accordingly, to this a volume of moderately cold air at the rate of ten percent of total drying air is introduced through the louvers 21 in the upper part of conical part 14 of the drying chamber. Temperature of this cool air is from 45–70°.

At the moment when the dry powder is discharged from the drying chamber it is between 120–140° F.

To prevent the hardening of the powder during storage a proper noncaking agent is added to it in the conveyor duct.

The dehydrating of fish solubles is another illustration: The essential parts of fish solubles for animal feeding purposes are amino acids, vitamins, and trace minerals.

Three other components of fish solubles should be taken into consideration in connection with dehydrating of this product. These components are sulphuric acid, fat (fish oil), and water.

Sulphuric acid is added to the liquid fish solubles as a preservative. In most cases it is used at a rate which is sufficient to secure pH 4.0 to 4.5 of the product. This degree of pH is accepted as a necessary level to retard spoilage of liquid. On the other hand, concentration of sulphuric acid at the above mentioned level is considered as safe from a biochemical viewpoint as long as the product remains in liquid form, with moisture content of approximately fifty percent. If this liquid product is used to make a dry product with moisture content, for example, of five per cent or less, then the sulphuric acid concentration would be increased to a much higher degree. High concentration of sulphuric acid and particularly at elevated temperatures induces a destruction of valuable amino acids and vitamins. At the same time dry fish solubles at a moisture content of less than five percent are not affected by microorganisms and use of a preservative, as sulphuric acid, is not necessary.

Fish oil in fish solubles is the result of incomplete oil separation at the fish processing plant. The amount of oil in fish solubles varies from as low as three percent to as high as twenty percent and over. Fish oil by nature is high in free fatty acids, which presents a problem of auto oxidation of the product during dehydration and after, during storage time.

The object of this invention is to neturalize the sulphuric acid and retard the oxidation of the dry product by adding an anti-oxidation agent. This is accomplished by the following method:

To the liquid fish solubles a sufficient amount of calcium hydroxide is added to change pH of raw material from original 4.0 to 4.5 to final 5.8. As a result calcium sulphate is formed, which is not destructive to amino acids or vitamins. One half to one pound of butylated hydroxy toluene is added to two thousand pounds of fish solubles to retard the oxidation of fatty acids. This solution is then passed through our plant as herebefore described. The sticky solution and particles will be held against contact with the inside of the dehydrating tank chamber until they have dried and are non-sticky.

If desired, a suitable non-caking compound may be introduced into the dried particles. We have found that one percent (1%) by weight of tricalcium phosphate may be injected and in the drawings we show a small hopper 31 adapted to contain such a non-caking compound and which is fed into the dried mass.

Some changes may be made in our methods of and means for dehydrating flowable matter without departing from the real spirit and purpose of our invention, and it is our intention to cover by our claims, any modified methods or use of equivalents which may be reasonably included within their scope.

We claim:

1. The method of dehydrating molasses comprising diluting the molasses with water, heating said diluted molasses, adding a clarifying agent with agitation of the mass, allowing any colloidal impurities present to settle, withdrawing the supernatant solution, heating said solution up to about one hundred and eighty degrees Fahrenheit, spraying the heated solution into the center top area of a tank chamber, the introduction of and downward directing of heated air into both the center top area of said tank chamber above the point of introduction of said solution and peripherally adjacent the inner wall of said tank chamber, the latter forming an air curtain adjacent said wall, and subsequently separating the dry particles and the air.

2. The method of dehydrating molasses, fish solubles, and the like comprising diluting the material to be dehydrated with water to forty-two degrees Brix, heating the diluted mass to about ninety-five degrees Fahrenheit, adding calcium hydroxide to the mass in amounts of about one percent by weight of calcium hydroxide, allowing any colloidal impurities present to settle, withdrawing the supernatant solution, heating said solution by direct live steam injection to approximately one-hundred and eighty-five degrees Fahrenheit, spraying the said solution into the center top area of a tank chamber, introducing downwardly directed heated air into both the center top area of said tank chamber above the point of introduction of said solution and peripherally adjacent the inner wall of said tank chamber, introducing a downwardly directed curtain of cool air peripherally adjacent the inner walls of said tank chamber at a point below introduction of the downwardly directed peripherally located heated air, withdrawing the dry particles and air from the bottom of the tank chamber by suction, separating the dry particles from the air and mixing tricalcium phosphate with said dried particles in an amount of about one percent by weight of tricalcium phosphate.

3. In a dehydrating means, a tank chamber having a side wall, a conduit extending into the top area of said tank chamber and adapted to be in communication with a source of supply of the matter to be dehydrated; spray means in said tank chamber and associated with said conduit; a heated air supply conduit terminating in the upper inside area of said tank chamber; air inlet passageways embracing the upper side wall of said tank chamber; downwardly and inwardly extending horizontal baffle members deposed in the upper portion of said tank chamber and substantially circumscribing said tank and in communication with said air inlet passageways said baffles directing the air downwardly and outwardly to form a curtain of air between the matter being dehydrated and the walls of the tank and fan means having its intake side communicating with the inside bottom of said tank member.

4. In a dehydrating means, a tank chamber having a side wall conduit extending into the top area of said tank chamber and adapted to be in communication with a source of supply of the matter to be dehydrated, spray means in said tank chamber and associated with said conduit, a heated air supply conduit terminating in the upper area of said tank chamber, a heated air inlet passageway embracing the upper side wall of said tank chamber, downwardly and inwardly extending horizontal baffle members deposed in the upper portion of said tank chamber and substantially circumscribing said tank and in communication with said heated air inlet passageway, a cool air inlet passageway in the lower side wall of said tank chamber downwardly and inwardly horizontal baffle members deposed in the lower portion of said tank chamber and substantially circumscribing said tank and in communication with said cool air inlet passageway, and fan means having its intake side communicating with the inside bottom of said tank chamber for the withdrawal of the dehydrated matter.

5. In a dehydrating means, a tank chamber having a side wall and an inverted cone bottom area, a conduit extending into the center top area of said chamber and adapted to be in communication with a source of supply of the matter to be dehydrated, spray means at the top of said tank chamber and associated with said conduit, downwardly and inwardly extending horizontal baffle members deposed in the upper portion of the wall of the tank chamber substantially circumscribing said tank, a jacket embracing said baffle members exterior to said tank, said jacket providing conduit means for a heated air supply flowing through said baffles into said tank chamber to form a curtain of air between the matter being dehydrated and the walls of the tank, a cool air passageway in the lower side wall of said tank, downwardly and inwardly extending horizontal baffle members in said cool air passageway and an exhaust motorized fan means communicating with the inside bottom of said tank for the withdrawal of the dehydrated matter.

References Cited in the file of this patent

UNITED STATES PATENTS

| | | |
|---|---|---|
| 1,897,729 | Mac Lachlan | Feb. 14, 1933 |
| 1,983,434 | Black et al. | Dec. 4, 1934 |
| 2,105,745 | Lewis | Jan. 18, 1938 |
| 2,240,854 | Peebles | May 6, 1941 |
| 2,525,224 | Kaiser | Oct. 10, 1950 |